US012772179B2

(12) United States Patent
Zhang et al.

(10) Patent No.: US 12,772,179 B2
(45) Date of Patent: Oct. 20, 2026

(54) SYSTEMS AND METHODS FOR ENHANCED POWER CONTROL UNDER POOR CHANNEL CONDITIONS

(71) Applicant: APPLE INC., Cupertino, CA (US)

(72) Inventors: Lijie Zhang, Beijing (CN); Zhiwei Wang, Beijing (CN); Lakshmi N Kavuri, San Jose, CA (US)

(73) Assignee: APPLE INC., Cupertino, CA (US)

( * ) Notice: Subject to any disclaimer, the term of this patent is extended or adjusted under 35 U.S.C. 154(b) by 484 days.

(21) Appl. No.: 18/351,016

(22) Filed: Jul. 12, 2023

(65) Prior Publication Data

US 2024/0073827 A1 Feb. 29, 2024

Related U.S. Application Data

(60) Provisional application No. 63/373,970, filed on Aug. 30, 2022.

(51) Int. Cl.
*H04W 52/24* (2009.01)
*H04W 52/42* (2009.01)

(52) U.S. Cl.
CPC ......... *H04W 52/245* (2013.01); *H04W 52/42* (2013.01)

(58) Field of Classification Search
None
See application file for complete search history.

(56) References Cited

U.S. PATENT DOCUMENTS 5,430,769 A * 7/1995 Patsiokas ............. H04B 7/0814 455/135
8,509,836 B2 8/2013 Shin et al.
9,674,789 B1 6/2017 Govindswamy et al.
9,832,741 B1 11/2017 Chukka et al.
2010/0285830 A1* 11/2010 Englund ............. H04W 52/146 455/522
2011/0159914 A1* 6/2011 Chen ................... H04W 52/362 455/522
2012/0008510 A1 1/2012 Cai et al.
2013/0029717 A1* 1/2013 Saitoh ................ H04W 52/221 455/522
2013/0045772 A1* 2/2013 Ohyama ............... H04W 52/56 455/522
2013/0094477 A1* 4/2013 Liu ........................ H04B 7/022 370/335
2013/0242794 A1* 9/2013 Liu ...................... H04B 7/0404 370/252

(Continued)

*Primary Examiner* — Gennadiy Tsvey
(74) *Attorney, Agent, or Firm* — Dorsey & Whitney LLP

(57) ABSTRACT

Systems and methods for enhanced power control at a user equipment (UE) under poor channel conditions respective to antenna transmit diversity (ATD) mechanisms are discussed herein. In some embodiments, a UE may reset a transmit power control (TPC) power adjustment value when an ATD antenna switch of the ATD mechanism is performed. In some embodiments, a UE may reduce the value of an ATD hysteresis timer upon determining that a reference signal receive power (RSRP) change on a monitored reference signal that drives a pathloss calculation at the UE exceeds a threshold. In some embodiments, a UE may scale a filtering coefficient of a pathloss calculation mechanism upon determining that an RSRP change on a monitored reference signal that drives a pathloss calculation at the UE exceeds a threshold.

12 Claims, 9 Drawing Sheets

(56) References Cited

U.S. PATENT DOCUMENTS

| | | | | |
|---|---|---|---|---|
| 2013/0308589 | A1* | 11/2013 | Liu | H04W 72/21 370/329 |
| 2014/0192727 | A1* | 7/2014 | Liu | H04B 7/0671 370/329 |
| 2014/0226498 | A1* | 8/2014 | Soliman | H04W 52/362 370/252 |
| 2014/0256322 | A1* | 9/2014 | Zhou | H04W 36/20 455/436 |
| 2015/0215019 | A1* | 7/2015 | Bengtsson | H04B 7/063 455/69 |
| 2016/0337984 | A1* | 11/2016 | Takeda | H04W 52/08 |
| 2019/0319678 | A1* | 10/2019 | Jiang | H04W 52/242 |
| 2020/0305094 | A1* | 9/2020 | Ouchi | H04W 52/325 |
| 2025/0063511 | A1* | 2/2025 | Wang | H04W 52/146 |

* cited by examiner

FIG. 1
100
102
104
106
108
110
112
114
116
Value
Value
0.00
t
t
ATD Switch
Pathloss
TPC Power Adjustment Value
Transmit Power

FIG. 2
200
202
204
206
208
210
212
214
ATD Switch
Pathloss
TPC Power Adjustment Value
Transmit Power
Value
Value
0.00
t
t

SYSTEMS AND METHODS FOR ENHANCED POWER CONTROL UNDER POOR CHANNEL CONDITIONS

TECHNICAL FIELD

This application relates generally to wireless communication systems, including wireless communications systems operating with user equipments that implement power control and antenna transmit diversity mechanisms.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and Institute of Electrical and Electronics Engineers (IEEE) 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two or more different frequency ranges. For example, Frequency Range 1 (FR1) may include frequency bands operating in sub-6 gigahertz (GHz) frequencies, some of which are bands that may be used by previous standards, and may potentially be extended to cover new spectrum offerings from 410 megahertz (MHz) to 7125 MHz. Frequency Range 2 (FR2) may include frequency bands from 24.25 GHz to 52.6 GHz. Note that in some systems, FR2 may also include frequency bands from 52.6 GHz to 71 GHz (or beyond). Bands in the millimeter wave (mmWave) range of FR2 may have smaller coverage but potentially higher available bandwidth than bands in FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
FIG. 1 illustrates graphs showing a conflict between power control mechanisms and ATD mechanisms at a UE, according to an embodiment.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

A UE may implement an antenna transmit diversity (ATD) mechanism, where the transmit (Tx) antenna(s) used by the UE may be switched (e.g., to better suit uplink (UL) channel conditions between the UE and a base station of a RAN). A switch in Tx antenna(s) according to such an ATD mechanism may be referred to herein as an "ATD antenna switch." The ATD mechanism may perform an ATD antenna switch in response to an ATD trigger.

In some circumstances, there may be a conflict between the use of power control methods implemented at the UE and the use of ATD mechanism at the UE. The ATD mechanism at the UE may implement an ATD hysteresis timer (e.g., a minimum time between switches of Tx antennas at the UE due to the ATD mechanism) to avoid a "ping-ponging" between Tx antennas. In some cases, this hysteresis timer may be over one second long. Such an ATD hysteresis timer may be understood as an example of an ATD trigger. It may be that within this period, a receive (Rx) chain at the UE may experience deep degradation of a reference signal receive power (RSRP). For example, an Rx0-RSRP corresponding to a monitored reference signal may be deeply degrading during this time. This may be due to, for example, high interference, which may cause the RSRP measurement to have poor accuracy (e.g., if a signal to interference noise ratio (SINR) is very poor, such as −10 decibels (dB)), with the effect that the Rx0-RSRP is measured at a low level. However, despite the low Rx0-RSRP measurement, the baseband circuitry of the UE keeps Tx on the poor antenna(s) due to the ATD hysteresis timer.

Meanwhile, power control mechanisms of the UE may be reacting to the deep degradation on Rx0-RSRP. At the UE, a pathloss estimation based on the Rx0-RSRP is calculated and filtered at a slot level, and could converge to high level in a relatively short amount of time as compared to a maximum length of the ATD hysteresis timer (e.g. 50-100 milliseconds (ms)). In response to the increasing pathloss estimation, the UE may increase its broadcast power correspondingly.

In some cases (e.g., where the poor RSRP measurement at the UE is due to interference localized to the UE location), it may be that this increase in broadcast power at the UE results in a high receive (Rx) power of that signaling at a base station of the network (which, for example, may be outside the interference experienced by the UE). In response to this high Rx power at the base station, the network could rapidly implement a downward TPC power adjustment value at the UE (e.g., a downward accumulated TPC power adjustment value at the UE) via closed-loop transmit power control (TPC) commands, to provide reasonable Rx power at network side.

It may then be that the ATD hysteresis timer expires, and the ATD mechanism thus allows the UE to switch to different Tx antenna(s). However, it may be that the UE continues to use the downward TPC power adjustment value that was determined relative to the old Tx antenna(s) prior to the ATD hysteresis timer expiration. Under these circumstances, a transmit power used by the UE determined using this TPC power adjustment value may not be sufficient to prevent UL failure with the base station.

FIG. 1 illustrates graphs 100 showing a conflict between power control mechanisms and ATD mechanisms at a UE, according to an embodiment. A first graph 102 illustrates a pathloss 106 as calculated at the UE over a period of time. A second graph 104 illustrates a TPC power adjustment value 108 that applies at the UE as well as the transmit power 110 used by the UE over the (same) period of time.

At a first time 112, the Rx0-RSRP (corresponding to the Tx antenna(s) being used) as measured at the UE becomes deeply degraded. This may be a result of, for example, interference that is local to the UE. As illustrated in the first graph 102, as a result, the pathloss 106 calculated at the UE begins to increase rapidly such that it converges to high level in a short time (e.g., it converges to the high level at the second time 114). In embodiments herein, it is contemplated that the Rx0-RSRP may be measured using, for example, a channel state information reference signal (CSI-RS) or a synchronization signal block (SSB) as transmitted from a base station of the network.

As illustrated in the second graph 104, the UE reacts to the rising pathloss 106 with a corresponding rise in its transmit power 110. This causes the Rx power of such signaling as measured at the base station to increase. Accordingly, in response, the network rapidly implements an accumulative lowering of a TPC power adjustment value 108 at the UE (and thus the transmit power 110) over time using TPC commands.

Then, at an ATD antenna switch time 116, an ATD hysteresis timer of the ATD mechanism expires, and the ATD mechanism accordingly allows the UE to switch to different Tx antenna(s). As illustrated in the first graph 102, per a UE implementation, the pathloss 106 understood by the UE is reset corresponding to the antenna switching behavior. However, the TPC power adjustment value 108 understood at the UE is not reset.

Due to the lowered TPC power adjustment value 108 and the reset pathloss 106 at/after the ATD antenna switch time 116, the transmit power 110 (at the new antenna(s)) as determined using the TPC power adjustment value 108 may be unreasonably low at/after the ATD antenna switch time 116, as illustrated in the second graph 104. This may result in an UL failure.

In embodiments herein, power control (e.g., in the case of a physical uplink control channel (PUSCH)) at a UE may be executed as:

$$P_{PUSCH,b,f,c}(i,\ j,\ q_d,\ l) = \min\left\{\begin{array}{c} P_{CMAX,f,c}(i), \\ P_{O\_PUSCH,b,f,c}(j) = 10\log_{10}\left(2^{\mu}\cdot M^{PUSCH}_{RB,b,f,c}(i)\right) + \propto_{b,f,c}(j)\cdot \\ PL_{b,f,c}(q_d) + \Delta_{TF,b,f,c}(i) + f_{b,f,c,}(i,\ l) \end{array}\right\},$$

where:

$PL_{b,f,c,}(q_d)$ is an estimated pathloss based on a downlink Rx0 reference signal measurement (e.g., based on an Rx0-RSRP), and $f_{b,f,c,}(i,l)$ is a TPC power adjustment value (e.g., an accumulated TPC power adjustment value).

A first proposal for avoiding an UL failure (as discussed in relation to FIG. 1) involves adjusting the UE implementation to reset a TPC power adjustment value used by the UE after an ATD antenna switch. This may be different from other UE implementations, where an (accumulated) TPC power adjustment may only reset in some other circumstances (e.g., when a random access channel (RACH) procedure is triggered). This adjustment to the use of the TPC mechanism at the UE is appropriate due to the fact that a prior closed-loop power adjustment (e.g., the accumulated TPC power adjustment) becomes situationally inapplicable in various cases (e.g., when an open-loop pathloss is reset due to an ATD antenna switch).

Accordingly, the UE implementation may be adjusted such that after an ATD antenna switch driving by the ATD mechanism, a TPC power adjustment value corresponding to a TPC mechanism used by the UE is reset. This reset allows the UE to use a transmit power on the new antenna(s) that is not affected by the TPC power adjustment value that was determined based on signaling that occurred on the old antenna(s). Accordingly, in such cases, the transmit power used by the UE after the ATD antenna switch that is determined using the reset TPC power adjustment value may be such that a UL failure with the base station that may have occurred in the case where the non-reset TPC power adjustment value was instead used (e.g., as is described in FIG. 1) is avoided.

Note that it may be that an open-loop power control mechanism provides that Rx power at network side is not higher than $P_{O\_PUSCH}$/$P_{O\_PUCCH}$/$P_{O\_SRS}$, and therefore does not contribute high interference.

In some cases, the reset occurs in every case/instance of an ATD antenna switch, and the TPC power adjustment value is set to zero as part of the reset.

In some cases, the reset occurs in response to determining, prior to the resetting, that the TPC power adjustment value exceeds a threshold value. It may be in such cases that the reset value is set by a timing advance command (TAC) in a message from the base station to the UE that is part of a RACH procedure (e.g., that is triggered corresponding to this TPC reset).

Figure 2:
FIG. 2 illustrates graphs corresponding to a resetting of a TPC power adjustment value at the time of an ATD antenna switch, according to an embodiment.

FIG. 2 illustrates graphs 200 corresponding to a resetting of a TPC power adjustment value at the time of an ATD antenna switch, according to an embodiment. A first graph 202 illustrates a pathloss 206 as calculated at the UE over a period of time. A second graph 204 illustrates a TPC power adjustment value 208 that applies at the UE as well as the transmit power 210 used by the UE over the (same) period of time.

As illustrated in FIG. 2, the pathloss 206, the TPC power adjustment value 208, and the transmit power 210 may follow the pathloss 106, the TPC power adjustment value 108, and the transmit power 210 of FIG. 1 up to the ATD antenna switch time 212 that occurs at the same time of the ATD antenna switch time 116 of FIG. 1. However, at the ATD antenna switch time 212 of FIG. 2, as illustrated, the TPC power adjustment value 208 used by the UE to determine a transmit power is reset 214 (e.g., in addition to the pathloss 206 also being reset, as illustrated).

The result of this reset 214 of the TPC power adjustment value 208 is that the transmit power 210 calculated after the ATD antenna switch time 212 based on the TPC power adjustment value 208 (and thus used by the UE on the new antenna(s) after the ATD antenna switch time 212) is reasonable to prevent UL failure with the base station. For example, in FIG. 2, a higher transmit power 210 after the ATD antenna switch time 212 is used than in the case in FIG. 1 of the transmit power 110 that is used by the UE after the ATD antenna switch time 116. Due to this relatively higher transmit power 210 after the ATD antenna switch time 212, the UE of FIG. 2 does not experience UL failure with the base station.

Note that while FIG. 2 illustrates the case where the TPC power adjustment value 208 is reset to zero, it is contemplated that in other embodiments a TPC power adjustment value may be reset to some other value (e.g., in the manner that is described herein).

Figure 3:
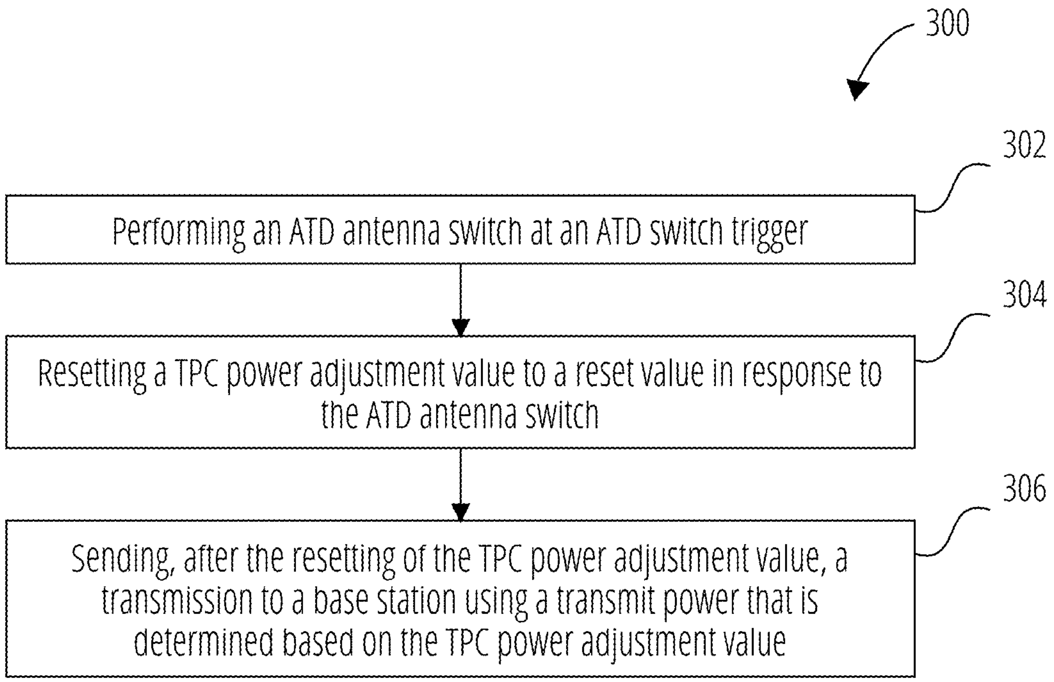
FIG. 3 illustrates a method of a UE, according to embodiments herein.

FIG. 3 illustrates a method 300 of a UE, according to embodiments herein. The method 300 includes performing 302 an ATD antenna switch at an ATD switch trigger.

The method 300 further includes resetting 304 a TPC power adjustment value to a reset value in response to the ATD antenna switch.

The method 300 further includes sending 306, after the resetting of the TPC power adjustment value, a transmission to a base station using a transmit power that is determined based on the TPC power adjustment value.

In some embodiments of the method 300, the ATD switch trigger comprises an expiration of an ATD hysteresis timer.

In some embodiments of the method 300, the reset value is zero.

In some embodiments of the method 300, the resetting of the TPC power adjustment value to the reset value is further in response to determining, prior to the resetting, that the TPC power adjustment value exceeds a threshold value. In some of these cases, the reset value is set by a TAC in a message from the base station to the UE that is part of a RACH procedure.

A second proposal for avoiding an UL failure (as discussed in relation to FIG. 1) involves using an aggressive (shortened) ATD hysteresis timer when a pathloss increase calculated at the UE (e.g., due to Rx0-RSRP measurement at the UE) is large/aggressive. This may help to avoid the issues described in relation to FIG. 1 by reducing any general timing mismatch between the expiration of the applicable ATD hysteresis timer and the timing of the increase in pathloss determined by the pathloss filtering mechanism of the UE.

Corresponding to the Rx0-RSRP measurements at the UE, the UE may determine that an RSRP change corresponding to measurements of the monitored reference signal (e.g., a CSI-RS and/or an SSB) exceeds a threshold value (where the surpassing of the threshold value corresponds to the identification of a large/aggressive pathloss increase). In response, the value of the ATD hysteresis timer that is currently applicable at the UE may be reduced by the UE, such that the ATD hysteresis timer expires sooner than it otherwise would have.

The earlier expiration of the ATD hysteresis timer causes the ATD antenna switch to be allowed prior to a full accumulation of a downward TPC power adjustment value at the UE that would have occurred through the original expiration time of the ATD hysteresis timer. Accordingly, the resulting TPC power adjustment value at the time of this (earlier) ATD antenna switch may be relatively higher, such that a transmit power determined based on this TPC power adjustment value is reasonable to prevent UL failure with the base station.

In such embodiments, the UE may evaluate the RSRP change within a time window. The UE may determine a lowest measured RSRP value measured on the monitored reference signal during the time window and a highest measured RSRP value measured on the monitored reference signal during the time window. The RSRP change value (that is compared to the threshold to determine whether to reduce the value of the ATD hysteresis timer) is then generated by subtracting the lowest measured RSRP value from the highest measured RSRP value.

In some cases, the value of the ATD hysteresis timer is reduced by an amount that corresponds or maps to the threshold being used. For example, a larger reduction may correspond or map to the use of a higher threshold, while a smaller reduction may correspond to or map to the use of a lower threshold. It is contemplated that multiple thresholds could be active at the UE, and in such cases it may be that the UE selects a reduction amount that corresponds or maps to the highest such threshold that is surpassed.

Figure 4:
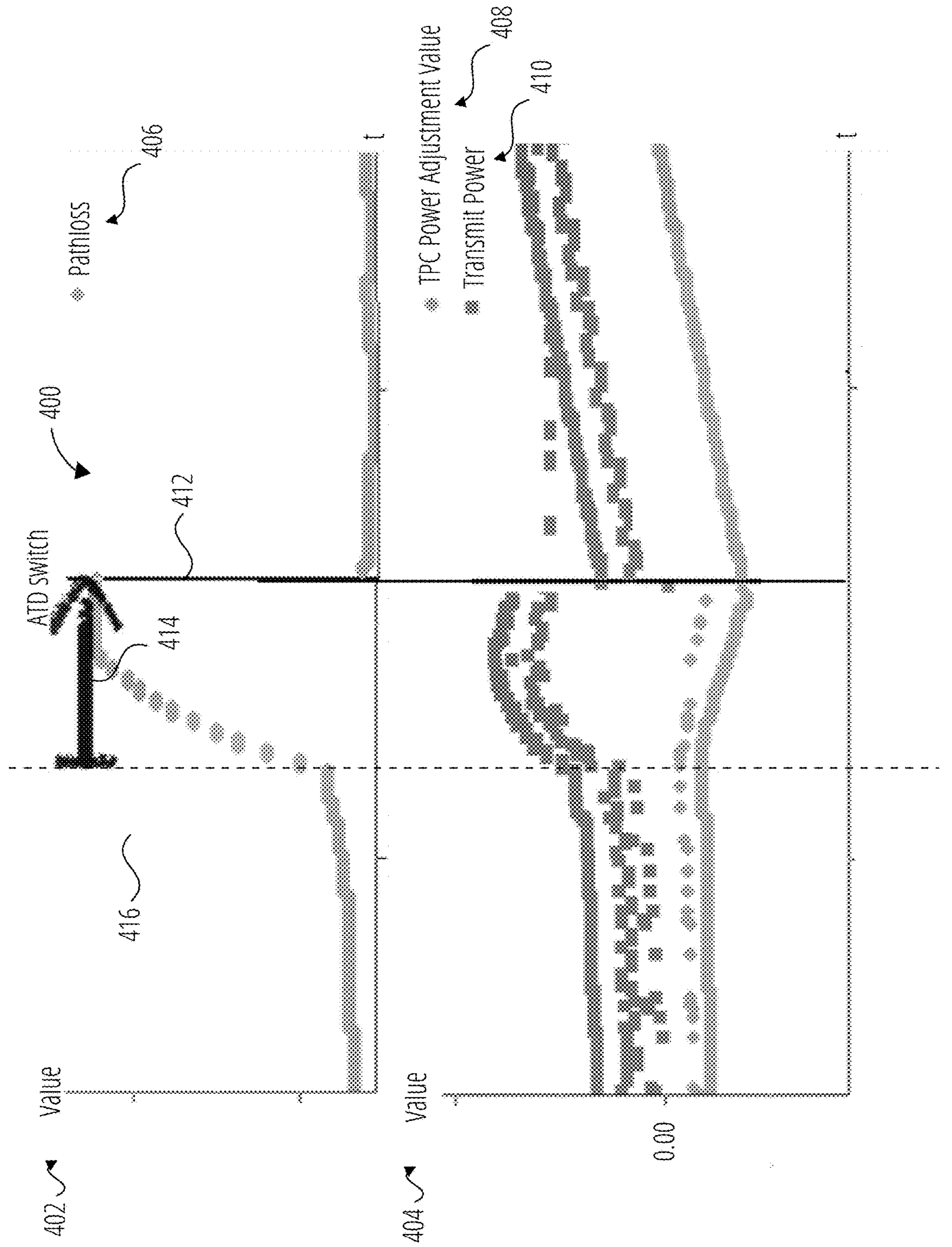
FIG. 4 illustrates graphs corresponding to a reduction of the value of an ATD hysteresis timer, according to an embodiment.

FIG. 4 illustrates graphs 400 corresponding to a reduction of the value of an ATD hysteresis timer, according to an embodiment. A first graph 402 illustrates a pathloss 406 as calculated at the UE over a period of time. A second graph 404 illustrates a TPC power adjustment value 408 that applies at the UE as well as the transmit power 410 used by the UE over the (same) period of time.

Analogously to the embodiment described in relation to FIG. 1, at a first time 416, the Rx0-RSRP (corresponding to the Tx antenna(s) being used) as measured at the UE becomes deeply degraded. As illustrated in the first graph 402, as a result, the pathloss 406 calculated at the UE begins to increase rapidly.

However, differently from the embodiment described in relation to FIG. 1, in reaction to the abrupt RSRP change in a small time window (which may be identified at the UE as has been described), the UE reduces 414 the value of an ATD hysteresis timer used at the UE, such that the ATD antenna switch time 412 occurs sooner than it otherwise would have (e.g., compare the time-axis location of the ATD antenna switch time 412 to the time-axis location of the ATD antenna switch time 116 in FIG. 1).

As can be seen in comparison to FIG. 1, the ATD antenna switch time 412 occurs prior to a full accumulation of a downward TPC power adjustment value 408 at the UE that would have occurred through the original expiration time of the ATD hysteresis timer (e.g., compare the value of the TPC power adjustment value 408 at the ATD antenna switch time 412 to the value of the TPC power adjustment value 108 at the ATD antenna switch time 116 of FIG. 1). Accordingly, the TPC power adjustment value applicable at this (earlier) ATD antenna switch time 412 is relatively higher, such that the transmit power 410 determined based on this TPC power adjustment value 408 at/after the ATD antenna switch time 412 is reasonable to prevent UL failure with the base station.

Figure 5:
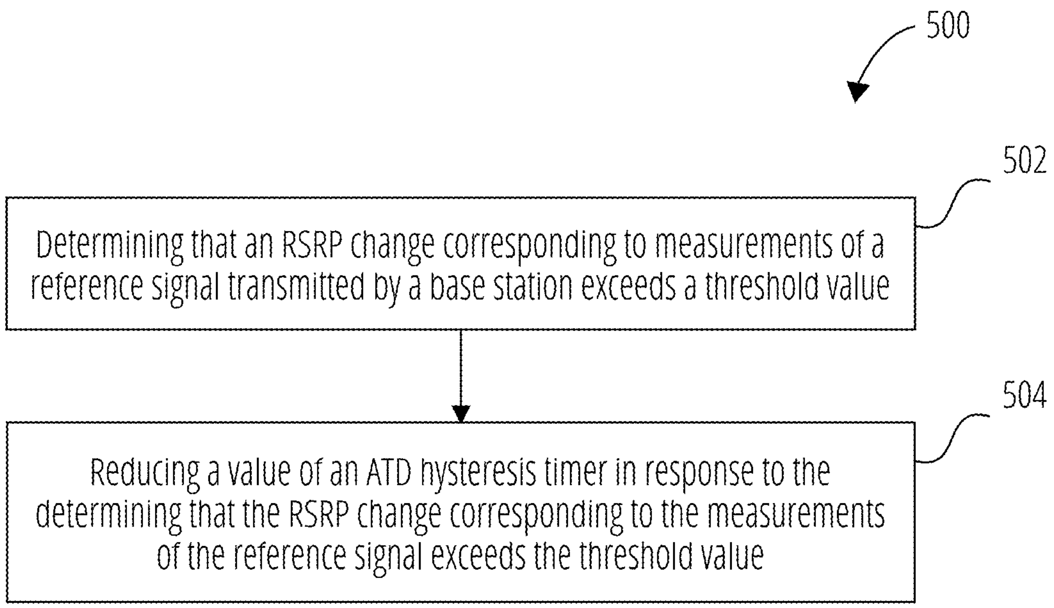
FIG. 5 illustrates a method of a UE, according to embodiments herein.

FIG. 5 illustrates a method 500 of a UE, according to embodiments herein. The method 500 includes determining 502 that an RSRP change corresponding to measurements of a reference signal transmitted by a base station exceeds a threshold value.

The method 500 further includes reducing 504 a value of an ATD hysteresis timer in response to the determining that the RSRP change corresponding to the measurements of the reference signal exceeds the threshold value.

In some embodiments, the method 500 further includes calculating the RSRP change corresponding to the measurements of the reference signal by determining a lowest measured RSRP value of the measurements of the reference signal during a time window, determining a highest measured RSRP value of the measurements of the reference signal during the time window, and subtracting the lowest measured RSRP value of the measurements of the reference signal during the time window from the highest measured RSRP value of the measurements of the reference signal during the time window.

In some embodiments of the method 500, the value of the ATD hysteresis timer is reduced by an amount that maps to the threshold value.

A third proposal for avoiding an UL failure (as discussed in relation to FIG. 1) involves adapting a pathloss filtering mechanism when a pathloss increase calculated at the UE (e.g., due to Rx0-RSRP measurement at the UE) would otherwise be large/aggressive. This may help to avoid the issues described in relation to FIG. 1 by reducing the amount by which a downward TPC power adjustment value accumulates prior to an ATD antenna switch.

Corresponding to the Rx0-RSRP measurements at the UE, the UE may determine that an RSRP change corresponding to measurements of the monitored reference signal (e.g., a CSI-RS and/or an SSB) exceeds a threshold value (where the surpassing of the threshold value corresponds to the identification of a large/aggressive pathloss increase). In response, the UE may scale a filtering coefficient used at the UE for pathloss calculations (such that a pathloss calculated at the UE increases more slowly).

Then, because the pathloss calculated at the UE increases more slowly, the transmit power used by the UE increases more slowly. This causes any downward TPC power adjustment responsive to the UE's increased power use to (also) be accumulated at the UE more slowly over time, such that by the time of the ATD antenna switch, a transmit power determined using the TPC power adjustment value may still be reasonable to prevent UL failure with the base station.

In such embodiments, the UE may evaluate the RSRP change by determining a first measured RSRP value measured on the monitored reference signal during a first RSRP measurement occasion for the monitored reference signal and a second measured RSRP value measured on the monitored reference signal during a second RSRP measurement occasion for the monitored reference signal. The RSRP change value (that is compared to the threshold to determine whether to implement scaling of the filtering coefficient for the pathloss mechanism) is then generated by subtracting the lowest measured RSRP value from the highest measured RSRP value.

In some cases, the second RSRP measurement occasion for the reference signal is subsequent to the first RSRP measurement occasion for the reference signal (e.g., the first RSRP measurement occasion and the second RSRP measurement occasion are consecutive RSRP measurement occasions).

In some cases, the first RSRP measurement occasion and the second RSRP measurement occasion each occur during an RSRP sampling period for checking the RSRP change against the threshold value (but are not necessarily consecutive RSRP measurement occasions within that sampling period).

In some cases, the filtering coefficient is scaled by an amount that corresponds or maps to the threshold being used. For example, a larger scaling amount may correspond or map to the use of a higher threshold, while a smaller scaling amount may correspond to or map to the use of a lower threshold. It is contemplated that multiple thresholds could be active at the UE, and in such cases it may be that the UE selects a scaling amount that corresponds or maps to the highest such threshold that is surpassed.

Figure 6:
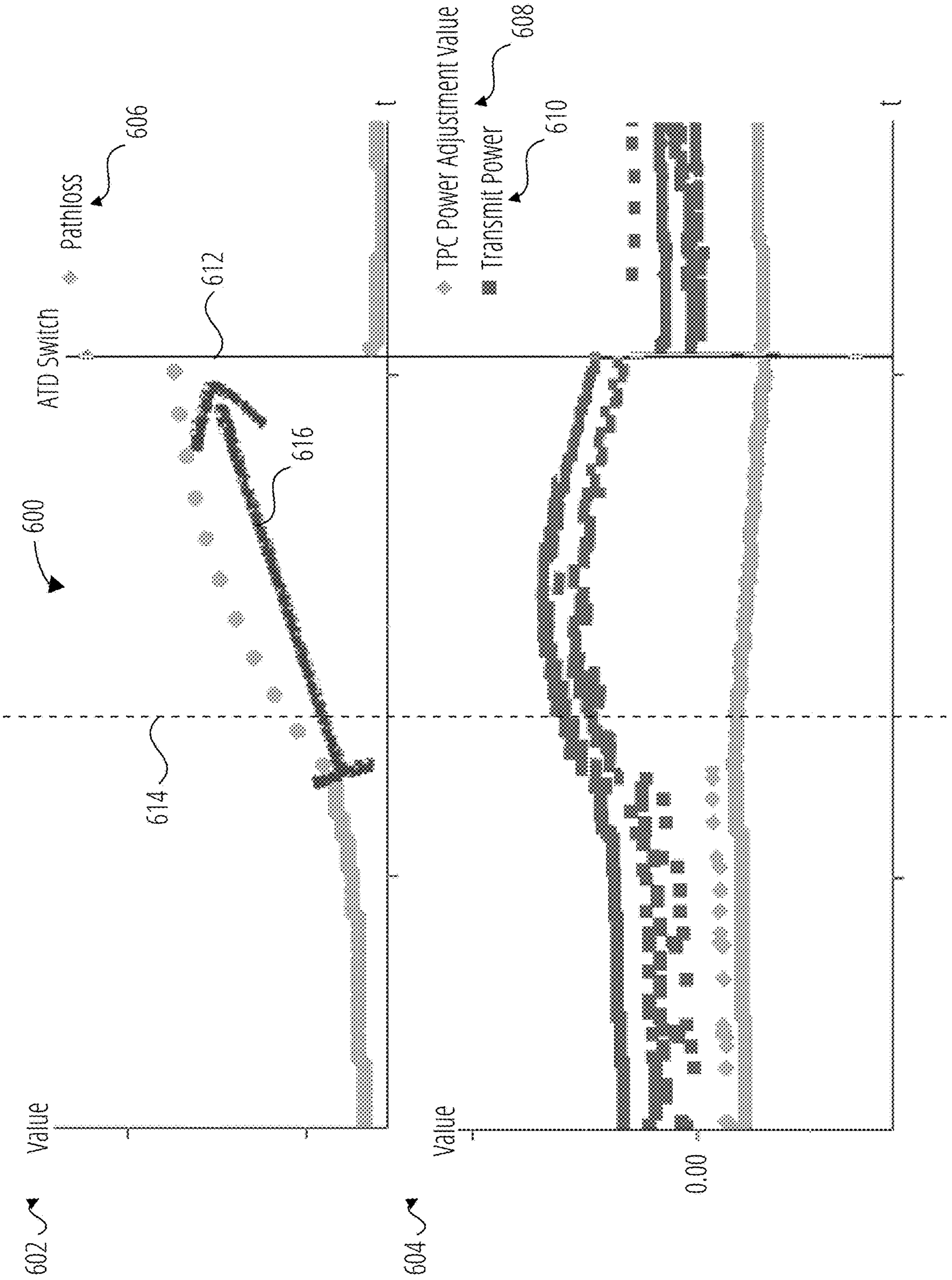
FIG. 6 illustrates graphs corresponding to a scaling of a filtering coefficient for a pathloss mechanism used at a UE, according to an embodiment.

FIG. 6 illustrates graphs 600 corresponding to a scaling of a filtering coefficient for a pathloss mechanism used at a UE, according to an embodiment. A first graph 602 illustrates a pathloss 606 as calculated at the UE over a period of time. A second graph 604 illustrates a TPC power adjustment value 608 that applies at the UE as well as the transmit power 610 used by the UE over the (same) period of time.

Analogously to the embodiment described in relation to FIG. 1, at a first time 614, the Rx0-RSRP (corresponding to the Tx antenna(s) being used) as measured at the UE becomes deeply degraded. However, differently from the embodiment described in relation to FIG. 1, in reaction to the abrupt RSRP change (which may be identified at the UE as has been described), the UE scales 616 the filtering coefficient used at the UE for pathloss calculations. As illustrated, this causes the pathloss 606 calculated at the UE to increase more slowly (e.g., as compared to the pathloss 106 of FIG. 1).

Because the pathloss 606 calculated at the UE increases more slowly, the transmit power 610 used by the UE increases more slowly. This causes the accumulation of any downward TPC power adjustment value 608 responsive to the UE's increased power use to (also) occur more slowly over time, such that by the ATD antenna switch time 612, the TPC power adjustment value used at the UE to determine a transmit power is relatively higher (e.g., compare the value of the TPC power adjustment value 608 at the ATD antenna switch time 612 to the value of the TPC power adjustment value 108 at the ATD antenna switch time 116 of FIG. 1). Accordingly, the transmit power 610 determined based on this TPC power adjustment value 608 at/after the ATD antenna switch time 612 is reasonable to prevent UL failure with the base station.

Figure 7:
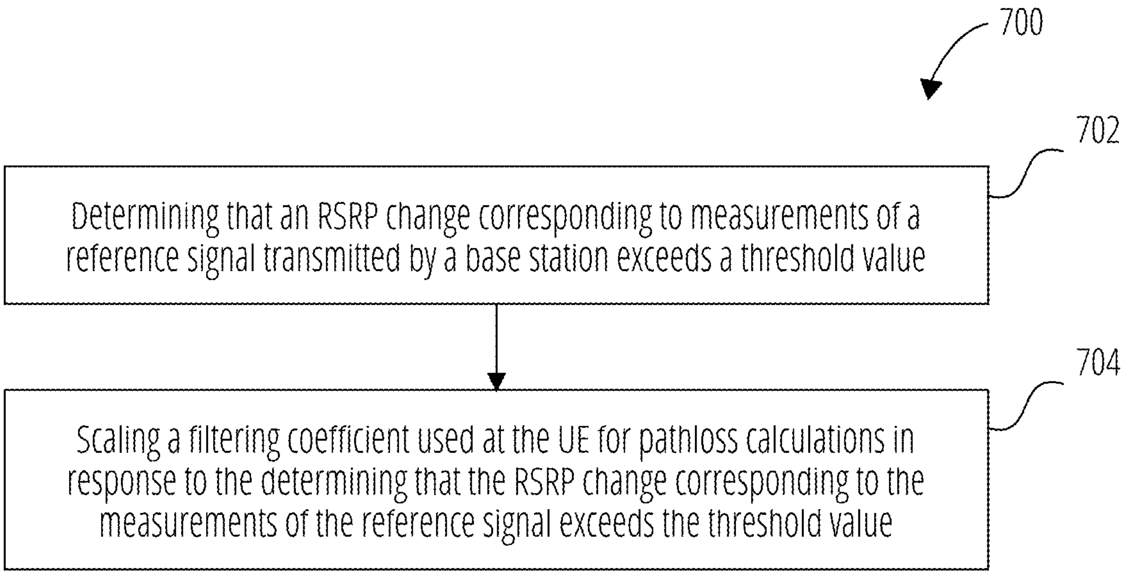
FIG. 7 illustrates a method of a UE, according to embodiments herein.

FIG. 7 illustrates a method 700 of a UE, according to embodiments herein. The method 700 includes determining

702 that an RSRP change corresponding to measurements of a reference signal transmitted by a base station exceeds a threshold value.

The method 700 further includes scaling 704 a filtering coefficient used at the UE for pathloss calculations in response to the determining that the RSRP change corresponding to the measurements of the reference signal exceeds the threshold value.

In some embodiments, the method 700 further includes calculating the RSRP change corresponding to the measurements of the reference signal by determining a first measured RSRP value by measuring the reference signal during a first RSRP measurement occasion for the reference signal, determining a second measured RSRP value by measuring the reference signal during a second RSRP measurement occasion for the reference signal, and subtracting the second measured RSRP value from the first measured RSRP value. In some of these cases, the second RSRP measurement occasion for the reference signal is subsequent to the first RSRP measurement occasion for the reference signal. In some of these cases, the first RSRP measurement occasion and the second RSRP measurement occasion each occur during an RSRP sampling period for checking the RSRP change against the threshold value.

In some embodiments of the method 700, an amount of the scaling of the filtering coefficient maps to the threshold value.

Figure 8:
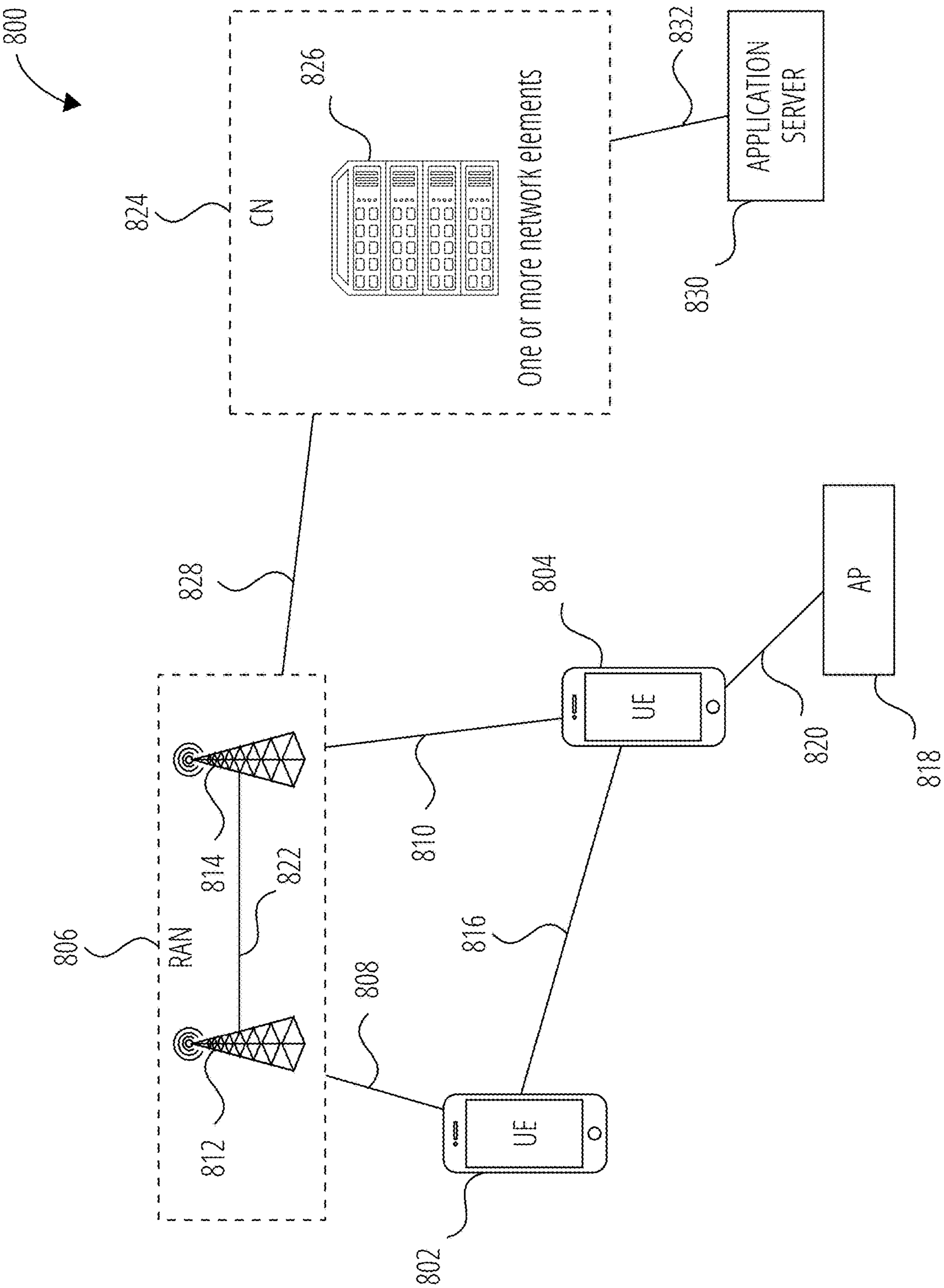
FIG. 8 illustrates an example architecture of a wireless communication system, according to embodiments disclosed herein.

FIG. 8 illustrates an example architecture of a wireless communication system 800, according to embodiments disclosed herein. The following description is provided for an example wireless communication system 800 that operates in conjunction with the LTE system standards and/or 5G or NR system standards as provided by 3GPP technical specifications.

As shown by FIG. 8, the wireless communication system 800 includes UE 802 and UE 804 (although any number of UEs may be used). In this example, the UE 802 and the UE 804 are illustrated as smartphones (e.g., handheld touchscreen mobile computing devices connectable to one or more cellular networks), but may also comprise any mobile or non-mobile computing device configured for wireless communication.

The UE 802 and UE 804 may be configured to communicatively couple with a RAN 806. In embodiments, the RAN 806 may be NG-RAN, E-UTRAN, etc. The UE 802 and UE 804 utilize connections (or channels) (shown as connection 808 and connection 810, respectively) with the RAN 806, each of which comprises a physical communications interface. The RAN 806 can include one or more base stations (such as base station 812 and base station 814) that enable the connection 808 and connection 810.

In this example, the connection 808 and connection 810 are air interfaces to enable such communicative coupling, and may be consistent with RAT(s) used by the RAN 806, such as, for example, an LTE and/or NR.

In some embodiments, the UE 802 and UE 804 may also directly exchange communication data via a sidelink interface 816. The UE 804 is shown to be configured to access an access point (shown as AP 818) via connection 820. By way of example, the connection 820 can comprise a local wireless connection, such as a connection consistent with any IEEE 802.11 protocol, wherein the AP 818 may comprise a Wi-Fi® router. In this example, the AP 818 may be connected to another network (for example, the Internet) without going through a CN 824.

In embodiments, the UE 802 and UE 804 can be configured to communicate using orthogonal frequency division multiplexing (OFDM) communication signals with each other or with the base station 812 and/or the base station 814 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 812 or base station 814 may be implemented as one or more software entities running on server computers as part of a virtual network. In addition, or in other embodiments, the base station 812 or base station 814 may be configured to communicate with one another via interface 822. In embodiments where the wireless communication system 800 is an LTE system (e.g., when the CN 824 is an EPC), the interface 822 may be an X2 interface. The X2 interface may be defined between two or more base stations (e.g., two or more eNBs and the like) that connect to an EPC, and/or between two eNBs connecting to the EPC. In embodiments where the wireless communication system 800 is an NR system (e.g., when CN 824 is a 5GC), the interface 822 may be an Xn interface. The Xn interface is defined between two or more base stations (e.g., two or more gNBs and the like) that connect to 5GC, between a base station 812 (e.g., a gNB) connecting to 5GC and an eNB, and/or between two eNBs connecting to 5GC (e.g., CN 824).

The RAN 806 is shown to be communicatively coupled to the CN 824. The CN 824 may comprise one or more network elements 826, which are configured to offer various data and telecommunications services to customers/subscribers (e.g., users of UE 802 and UE 804) who are connected to the CN 824 via the RAN 806. The components of the CN 824 may be implemented in one physical device or separate physical devices including components to read and execute instructions from a machine-readable or computer-readable medium (e.g., a non-transitory machine-readable storage medium).

In embodiments, the CN 824 may be an EPC, and the RAN 806 may be connected with the CN 824 via an S1 interface 828. In embodiments, the S1 interface 828 may be split into two parts, an S1 user plane (S1-U) interface, which carries traffic data between the base station 812 or base station 814 and a serving gateway (S-GW), and the S1-MME interface, which is a signaling interface between the base station 812 or base station 814 and mobility management entities (MMEs).

In embodiments, the CN 824 may be a 5GC, and the RAN 806 may be connected with the CN 824 via an NG interface 828. In embodiments, the NG interface 828 may be split into two parts, an NG user plane (NG-U) interface, which carries traffic data between the base station 812 or base station 814 and a user plane function (UPF), and the S1 control plane (NG-C) interface, which is a signaling interface between the base station 812 or base station 814 and access and mobility management functions (AMFs).

Generally, an application server 830 may be an element offering applications that use internet protocol (IP) bearer resources with the CN 824 (e.g., packet switched data services). The application server 830 can also be configured to support one or more communication services (e.g., VoIP sessions, group communication sessions, etc.) for the UE 802 and UE 804 via the CN 824. The application server 830 may communicate with the CN 824 through an IP communications interface 832.

Figure 9:
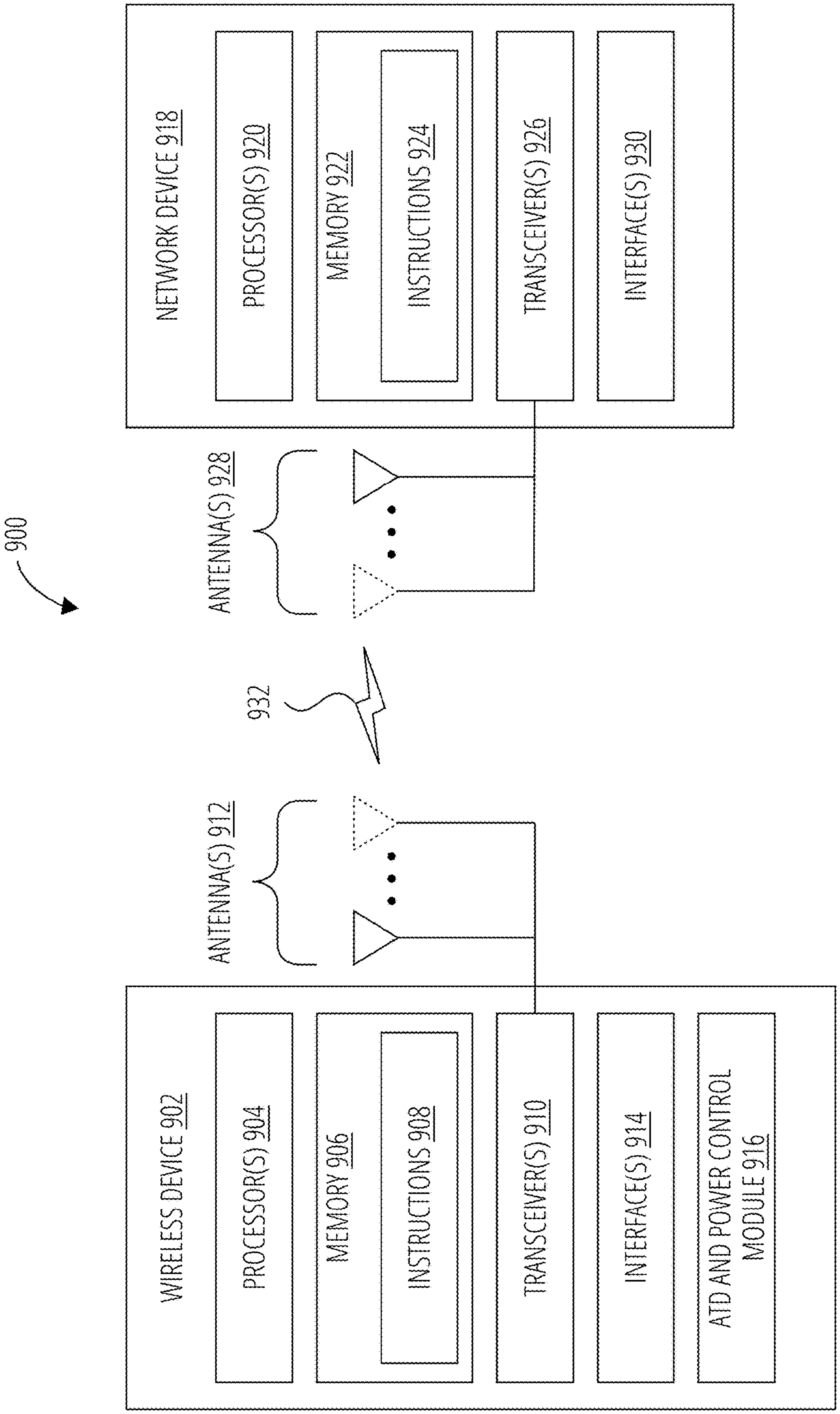
FIG. 9 illustrates a system for performing signaling between a wireless device and a network device, according to embodiments disclosed herein.

FIG. 9 illustrates a system 900 for performing signaling 932 between a wireless device 902 and a network device 918, according to embodiments disclosed herein. The system 900 may be a portion of a wireless communications system as herein described. The wireless device 902 may be, for example, a UE of a wireless communication system. The network device 918 may be, for example, a base station (e.g., an eNB or a gNB) of a wireless communication system.

The wireless device 902 may include one or more processor(s) 904. The processor(s) 904 may execute instructions such that various operations of the wireless device 902 are performed, as described herein. The processor(s) 904 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 902 may include a memory 906. The memory 906 may be a non-transitory computer-readable storage medium that stores instructions 908 (which may include, for example, the instructions being executed by the processor(s) 904). The instructions 908 may also be referred to as program code or a computer program. The memory 906 may also store data used by, and results computed by, the processor(s) 904.

The wireless device 902 may include one or more transceiver(s) 910 that may include radio frequency (RF) transmitter and/or receiver circuitry that use the antenna(s) 912 of the wireless device 902 to facilitate signaling (e.g., the signaling 932) to and/or from the wireless device 902 with other devices (e.g., the network device 918) according to corresponding RATs.

The wireless device 902 may include one or more antenna(s) 912 (e.g., one, two, four, or more). For embodiments with multiple antenna(s) 912, the wireless device 902 may leverage the spatial diversity of such multiple antenna(s) 912 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 902 may be accomplished according to precoding (or digital beamforming) that is applied at the wireless device 902 that multiplexes the data streams across the antenna(s) 912 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 902 may implement analog beamforming techniques, whereby phases of the signals sent by the antenna(s) 912 are relatively adjusted such that the (joint) transmission of the antenna(s) 912 can be directed (this is sometimes referred to as beam steering).

The wireless device 902 may include one or more interface(s) 914. The interface(s) 914 may be used to provide input to or output from the wireless device 902. For example, a wireless device 902 that is a UE may include interface(s) 914 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 910/antenna(s) 912 already described) that allow for communication between the UE and other devices and may operate according to known protocols (e.g., Wi-Fi®, Bluetooth®, and the like).

The wireless device 902 may include an ATD and power control module 916. The ATD and power control module 916 may be implemented via hardware, software, or combinations thereof. For example, the ATD and power control module 916 may be implemented as a processor, circuit, and/or instructions 908 stored in the memory 906 and executed by the processor(s) 904. In some examples, the ATD and power control module 916 may be integrated within the processor(s) 904 and/or the transceiver(s) 910. For example, the ATD and power control module 916 may be implemented by a combination of software components (e.g., executed by a DSP or a general processor) and hardware components (e.g., logic gates and circuitry) within the processor(s) 904 or the transceiver(s) 910.

The ATD and power control module 916 may be used for various aspects of the present disclosure, for example, aspects of FIG. 1 to FIG. 7. The ATD and power control module 916 may be configured to, for example, reset a TPC power control value used by the UE, reduce the value of an ATD hysteresis timer used by the UE, and/or scale a filtering coefficient of a pathloss mechanism used by the UE, as discussed herein.

The network device 918 may include one or more processor(s) 920. The processor(s) 920 may execute instructions such that various operations of the network device 918 are performed, as described herein. The processor(s) 920 may include one or more baseband processors implemented using, for example, a CPU, a DSP, an ASIC, a controller, an FPGA device, another hardware device, a firmware device, or any combination thereof configured to perform the operations described herein.

The network device 918 may include a memory 922. The memory 922 may be a non-transitory computer-readable storage medium that stores instructions 924 (which may include, for example, the instructions being executed by the processor(s) 920). The instructions 924 may also be referred to as program code or a computer program. The memory 922 may also store data used by, and results computed by, the processor(s) 920.

The network device 918 may include one or more transceiver(s) 926 that may include RF transmitter and/or receiver circuitry that use the antenna(s) 928 of the network device 918 to facilitate signaling (e.g., the signaling 932) to and/or from the network device 918 with other devices (e.g., the wireless device 902) according to corresponding RATs.

The network device 918 may include one or more antenna(s) 928 (e.g., one, two, four, or more). In embodiments having multiple antenna(s) 928, the network device 918 may perform MIMO, digital beamforming, analog beamforming, beam steering, etc., as has been described.

The network device 918 may include one or more interface(s) 930. The interface(s) 930 may be used to provide input to or output from the network device 918. For example, a network device 918 that is a base station may include interface(s) 930 made up of transmitters, receivers, and other circuitry (e.g., other than the transceiver(s) 926/antenna(s) 928 already described) that enables the base station to communicate with other equipment in a core network, and/or that enables the base station to communicate with external networks, computers, databases, and the like for purposes of operations, administration, and maintenance of the base station or other equipment operably connected thereto.

Embodiments contemplated herein include an apparatus comprising means to perform one or more elements of any of the method 300, the method 500, and the method 700. This apparatus may be, for example, an apparatus of a UE (such as a wireless device 902 that is a UE, as described herein).

Embodiments contemplated herein include one or more non-transitory computer-readable media comprising instructions to cause an electronic device, upon execution of the instructions by one or more processors of the electronic device, to perform one or more elements of any of the method 300, the method 500, and the method 700. This non-transitory computer-readable media may be, for example, a memory of a UE (such as a memory 906 of a wireless device 902 that is a UE, as described herein).

Embodiments contemplated herein include an apparatus comprising logic, modules, or circuitry to perform one or more elements of any of the method 300, the method 500, and the method 700. This apparatus may be, for example, an apparatus of a UE (such as a wireless device 902 that is a UE, as described herein).

Embodiments contemplated herein include an apparatus comprising: one or more processors and one or more computer-readable media comprising instructions that, when executed by the one or more processors, cause the one or more processors to perform one or more elements of any of the method 300, the method 500, and the method 700. This apparatus may be, for example, an apparatus of a UE (such as a wireless device 902 that is a UE, as described herein).

Embodiments contemplated herein include a signal as described in or related to one or more elements of any of the method 300, the method 500, and the method 700.

Embodiments contemplated herein include a computer program or computer program product comprising instructions, wherein execution of the program by a processor is to cause the processor to carry out one or more elements of any of the method 300, the method 500, and the method 700. The processor may be a processor of a UE (such as a processor(s) 904 of a wireless device 902 that is a UE, as described herein). These instructions may be, for example, located in the processor and/or on a memory of the UE (such as a memory 906 of a wireless device 902 that is a UE, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems, or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE), comprising:

performing an antenna transmit diversity (ATD) antenna switch at an ATD switch trigger;

resetting a transmit power control (TPC) power adjustment value to a reset value, wherein the resetting is performed in response to the ATD antenna switch and a determination that the TPC power adjustment value exceeds a threshold value;

determining a transmit power of the UE based on the reset value of the TPC power adjustment value; and sending a transmission to a base station using the transmit power.

2. The method of claim 1, wherein the ATD switch trigger comprises an expiration of an ATD hysteresis timer.

3. The method of claim 1, wherein the reset value is zero.

4. The method of claim 1, wherein the reset value is set by a timing advance command (TAC) in a message from the base station to the UE that is part of a random access channel (RACH) procedure.

5. An apparatus for a user equipment (UE) comprising:

one or more processors; and a memory storing instructions that, when executed by the one or more processors, configure the apparatus to:

perform an antenna transmit diversity (ATD) antenna switch at an ATD switch trigger;

reset a transmit power control (TPC) power adjustment value to a reset value, wherein the reset is performed in response to the ATD antenna switch and a determination, by the apparatus, that the TPC power adjustment value exceeds a threshold value;

determine a transmit power of the UE based on the reset value of the TPC power adjustment value; and send a transmission to a base station using the transmit power.

6. The apparatus of claim 5, wherein the ATD switch trigger comprises an expiration of an ATD hysteresis timer.

7. The apparatus of claim 5, wherein the reset value is zero.

8. The apparatus of claim 5, wherein the reset value is set by a timing advance command (TAC) in a message from the base station to the UE that is part of a random access channel (RACH) procedure.

9. A non-transitory computer-readable storage medium including instructions that when executed by one or more processors of a user equipment (UE), cause the UE to:

perform an antenna transmit diversity (ATD) antenna switch at an ATD switch trigger;

reset a transmit power control (TPC) power adjustment value to a reset value, wherein the reset is performed in response to the ATD antenna switch and a determination, by the UE, that the TPC power adjustment value exceeds a threshold value;

determine a transmit power of the UE based on the reset value of the TPC power adjustment value; and send a transmission to a base station using the transmit power.

10. The non-transitory computer-readable storage medium of claim 9, wherein the ATD switch trigger comprises an expiration of an ATD hysteresis timer.

11. The non-transitory computer-readable storage medium of claim 9, wherein the reset value is zero.

12. The non-transitory computer-readable storage medium of claim 9, wherein the reset value is set by a timing advance command (TAC) in a message from the base station to the UE that is part of a random access channel (RACH) procedure.

* * * * *